(12) United States Patent
Jaipuria et al.

(10) Patent No.: US 12,430,899 B2
(45) Date of Patent: Sep. 30, 2025

(54) DE-BIASING DATASETS FOR MACHINE LEARNING

(71) Applicant: Ford Global Technologies, LLC, Dearborn, MI (US)

(72) Inventors: Nikita Jaipuria, Pittsburgh, PA (US); Xianling Zhang, San Jose, CA (US); Katherine Stevo, Wellesley, MA (US); Jinesh Jain, San Francisco, CA (US); Vidya Nariyambut Murali, Sunnyvale, CA (US); Meghana Laxmidhar Gaopande, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 473 days.

(21) Appl. No.: 17/817,235

(22) Filed: Aug. 3, 2022

(65) Prior Publication Data

US 2024/0046625 A1   Feb. 8, 2024

Related U.S. Application Data

(60) Provisional application No. 63/234,763, filed on Aug. 19, 2021.

(51) Int. Cl.
*G06V 10/778* (2022.01)
*G06V 10/77* (2022.01)

(52) U.S. Cl.
CPC ........ *G06V 10/778* (2022.01); *G06V 10/7715* (2022.01)

(58) Field of Classification Search
None
See application file for complete search history.

(56) References Cited

U.S. PATENT DOCUMENTS

| | | | |
|---|---|---|---|
| 10,977,571 | B2 | 4/2021 | Miserendino et al. |
| 11,620,471 | B2 * | 4/2023 | Brock .................. G06F 21/563 706/12 |
| 2010/0329529 | A1 * | 12/2010 | Feldman .......... G06F 18/21375 382/131 |
| 2016/0041958 | A1 | 2/2016 | Zhuang et al. |

(Continued)

OTHER PUBLICATIONS

Van der Maaten, L., et al. "Visualizing Data using t-SNE," Journal of Machine Learning Research 9, 2008, 27 pages.

(Continued)

*Primary Examiner* — Tsung Yin Tsai
(74) *Attorney, Agent, or Firm* — Frank A. MacKenzie; Brooks Kushman P.C.

(57) ABSTRACT

A computer includes a processor and a memory storing instructions executable by the processor to receive a dataset of images; extract feature data from the images; optimize a number of clusters into which the images are classified based on the feature data; for each cluster, optimize a number of subclusters into which the images in that cluster are classified; determine a metric indicating a bias of the dataset toward at least one of the clusters or subclusters based on the number of clusters, the numbers of subclusters, distances between the respective clusters, and distances between the respective subclusters; and after determining the metric, train a machine-learning program using a training set constructed from the clusters and the subclusters.

15 Claims, 9 Drawing Sheets

(56) References Cited

U.S. PATENT DOCUMENTS

| | | | | |
|---|---|---|---|---|
| 2017/0006135 | A1* | 1/2017 | Siebel | G06F 8/24 |
| 2017/0249547 | A1 | 8/2017 | Shrikumar et al. | |
| 2017/0255840 | A1 | 9/2017 | Jean et al. | |
| 2018/0150724 | A1* | 5/2018 | Brock | G06F 18/23 |
| 2018/0189635 | A1* | 7/2018 | Olarig | G06F 16/583 |
| 2019/0244253 | A1* | 8/2019 | Vij | G06F 18/214 |
| 2020/0401851 | A1* | 12/2020 | Mau | G06F 16/583 |
| 2022/0167928 | A1* | 6/2022 | Baek | A61B 5/7264 |
| 2022/0261628 | A1* | 8/2022 | Surya | G06N 20/00 |
| 2022/0296930 | A1* | 9/2022 | Chen | A61N 5/1045 |
| 2024/0046625 | A1* | 2/2024 | Jaipuria | G06V 20/70 |

OTHER PUBLICATIONS

Johnson, J., et al., Perceptual Losses for Real-Time Style Transfer and Super-Resolution, Department of Computer Science, Stanford University, 2016, 17 pages.

"7 Types of Data Bias in Machine Learning," TELUS International, Jan. 1, 2021, 9 pages.

Wang, Z, et al., "Multi-Scale Structural Similarity for Image Quality Assessment," Proceedings of the 37th IEEE Asilomar Conference on Signals, Systems and Computers, Nov. 2003, 5 pages.

McInnes, L, et al., "UMAP: Uniform Manifold Approximation and Projection for Dimension Reduction." ArXiv, 2018, 5 pages.

Zhang, R., et al. "Perceptual Similarity Metric and Dataset," CVPR, 2018, 8 pages.

* cited by examiner

DE-BIASING DATASETS FOR MACHINE LEARNING

CROSS-REFERENCE TO RELATED APPLICATION

This application claims priority to provisional U.S. Patent Appl. No. 63/234,763, filed on Aug. 19, 2021, which is hereby incorporated by reference in its entirety.

BACKGROUND

Data bias in machine learning is a type of error in which certain elements of a dataset are more heavily weighted and/or represented than others. A biased dataset does not accurately represent a model's use case, resulting in possibly skewed outcomes, low accuracy levels, and analytical errors.

DETAILED DESCRIPTION

Figure 1:
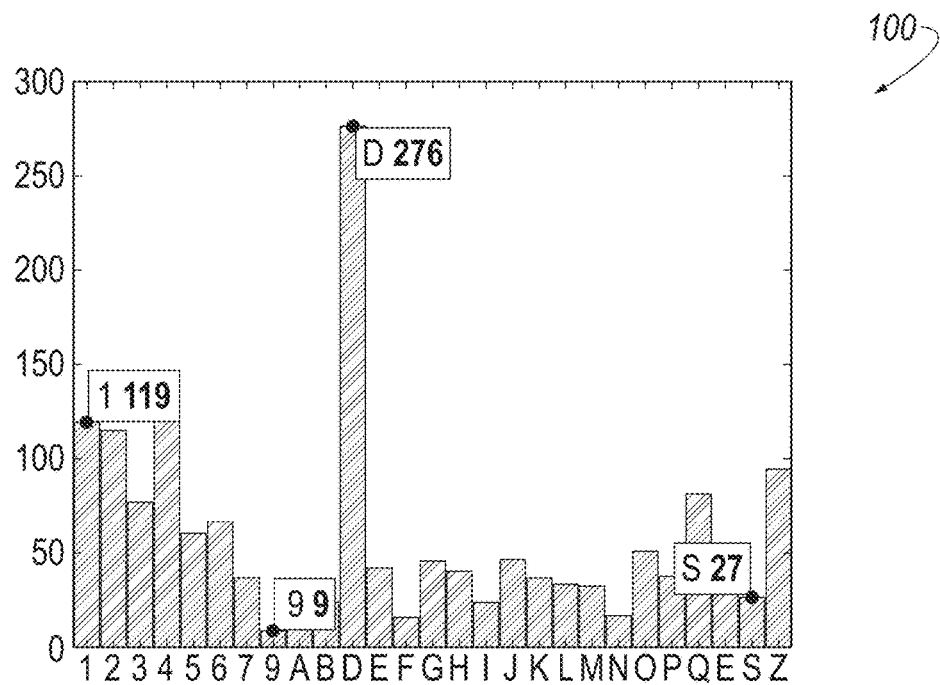
FIG. 1 is a bar chart of categories of images in an example dataset.

FIG. 1 shows a bar chart of an example dataset of images of trailers, e.g., for hitching to a motor vehicle. The images in the dataset are sorted in classes 100 labeled with a number such as 1, 2, 3, etc. or a letter such as A, B, D, etc. The dataset is biased because, e.g., class D is overrepresented and other classes 100 such as class 9 are underrepresented. The overrepresented classes 100 may skew a machine-learning program trained on the dataset into overidentifying objects into those classes 100, and the underrepresented classes 100 may have insufficient samples to demonstrate statistically significant results when used to train the machine-learning program.

Figure 3:
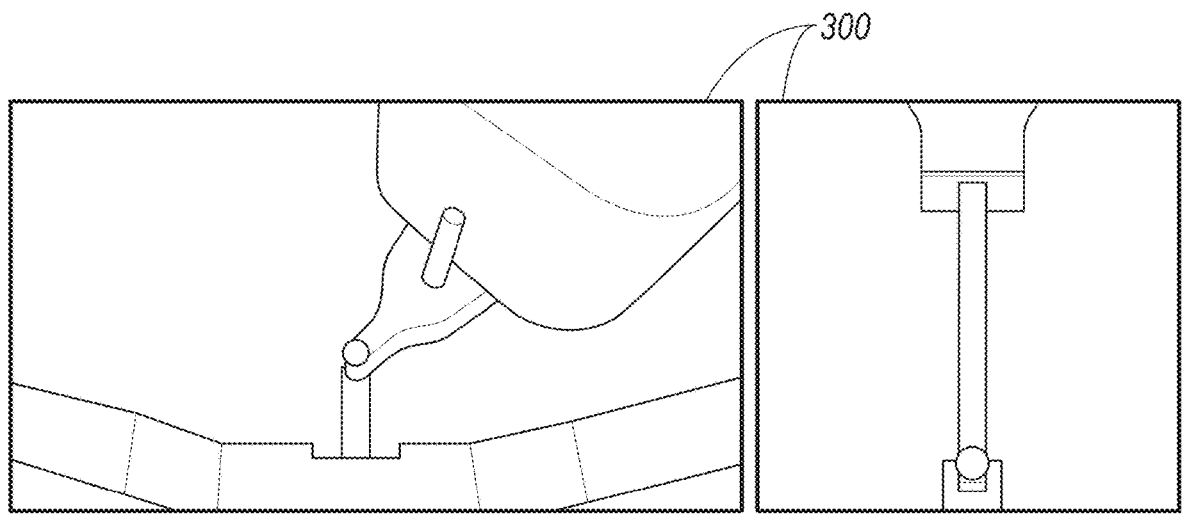
FIG. 3 is a pair of example images from the example dataset.

Vision-based perception tasks are often affected by dataset bias, especially in the case of limited or small datasets. Some ways to mitigate bias include changing architectures used in the machine learning (e.g., neural network architectures), changing training procedures, and augmenting the dataset. However, there is not a solid metric available to effectively visualize and measure the amount of bias in a given dataset. Such a metric would also be instrumental in guiding data augmentation and purposeful data collection. Moreover, typical metadata annotation may not capture nuances such as, in the context of trailers, wires, chains, shadow direction, contrast, etc., which are illustrated in FIG. 3. These nuances can play an important role in the performance of machine-learning programs such as deep neural network models.

The systems and techniques described herein can generate metadata annotations sensitive to these types of nuances. Datasets labeled with these annotations can be used to train more effective machine-learning programs, e.g., for classifying image data. To that end, a computer can be programmed to extract feature data from a dataset of images, optimize a number of clusters and numbers of subclusters within the clusters into which the images are classified, determine a metric indicating bias of the dataset toward one or more clusters or subclusters, and then train a machine-learning program using a training set constructed from the clusters and subclusters. These instructions may be used to not just showcase dataset bias but also to perform several other applications such as automatic metadata annotation correction, complex edge/corner cases detection, training and test dataset curation for artificial-intelligence and machine-learning models, data augmentation guidance, and visualization and quantification of gaps between simulated and real datasets. In particular, the machine-learning program may have good performance by training on a training set from a less biased dataset. The machine-learning program may be installed on a vehicle and perform a task useful for autonomous or semi-autonomous operation such as object recognition.

A computer includes a processor and a memory storing instructions executable by the processor to receive a dataset of images; extract feature data from the images; optimize a number of clusters into which the images are classified based on the feature data; for each cluster, optimize a number of subclusters into which the images in that cluster are classified; determine a metric indicating a bias of the dataset toward at least one of the clusters or subclusters based on the number of clusters, the numbers of subclusters, distances between the respective clusters, and distances between the respective subclusters; and after determining the metric, train a machine-learning program using a training set constructed from the clusters and the subclusters.

In an example, the instructions may further include instructions to reduce a dimensionality of the feature data. In a further example, optimizing the number of clusters may be based on the feature data after reducing the dimensionality.

In a further example, the instructions may further include instructions to, after reducing the dimensionality of the feature data, map the feature data to a limited number of dimensions. In a yet further example, the limited number of dimensions may be two.

In a further example, reducing the dimensionality of the feature data may include performing principal component analysis. In a yet further example, the principal component analysis may result in a matrix of principal components, and the instructions may further include instructions to map the matrix of principal components to a limited number of dimensions.

In an example, the machine-learning program may be a second machine-learning program, and extracting the feature data may include executing a first machine-learning program. In a further example, the first machine-learning program may be trained to identify objects in images, and the feature data may be output from an intermediate layer of the first machine-learning program.

In an example, optimizing the number of clusters may be based on a silhouette score of the images. In a further example, optimizing the number of clusters may include performing k-means clustering for a plurality of values for the number of clusters, determining the silhouette score for each of the values, and selecting one of the values based on the silhouette scores.

In an example, the distances between the respective clusters may be distances between centroids of the respective clusters, and the distances between the respective subclusters may be distances between centroids of the respective subclusters.

In an example, the instructions may further include instructions to, for each cluster, determine a perceptual-similarity score between each pair of the images in that cluster; and for each cluster, optimizing the number of subclusters in that cluster may be based on the perceptual-similarity scores for that cluster. In a further example, the instructions may further include instructions to, for each cluster, reduce a dimensionality of the perceptual-similarity scores for that cluster; and for each cluster, optimizing the number of subclusters in that cluster may be based on the perceptual-similarity scores for that cluster after reducing the dimensionality. In a yet further example, for each cluster, reducing the dimensionality of the perceptual-similarity scores may include performing principal component analysis. In a yet still further example, for each cluster, the principal component analysis may result in a matrix of principal components, and the instructions may further include instructions to map the matrix of principal components to a limited number of dimensions. In a yet still further example, the limited number of dimensions may be two.

In an example, the clusters and subclusters may serve as ground truth when training the machine-learning program.

In an example, the instructions may further include instructions to preprocess the images to a standard size before extracting the feature data.

A method includes receiving a dataset of images; extracting feature data from the images; optimizing a number of clusters into which the images are classified based on the feature data; for each cluster, optimizing a number of subclusters into which the images in that cluster are classified; determining a metric indicating a bias of the dataset toward at least one of the clusters or subclusters based on the number of clusters, the numbers of subclusters, distances between the respective clusters, and distances between the respective subclusters; and after determining the metric, training a machine-learning program using a training set constructed from the clusters and the subclusters.

With reference to FIGS. 2-10, a computer 200 includes a processor 205 and a memory 210 storing instructions executable by the processor 205 to receive a dataset 600 of images 300; extract feature data from the images 300; optimize a number of clusters 900 into which the images 300 are classified based on the feature data; for each cluster 900, optimize a number of subclusters 1000 into which the images 300 in that cluster 900 are classified; determine a metric indicating a bias of the dataset 600 toward at least one of the clusters 900 or subclusters 1000 based on the number of clusters 900, the numbers of subclusters 1000, distances between the respective clusters 900, and distances between the respective subclusters 1000; and after determining the metric, train a machine-learning program using a training set constructed from the clusters 900 and the subclusters 1000.

Figure 2:
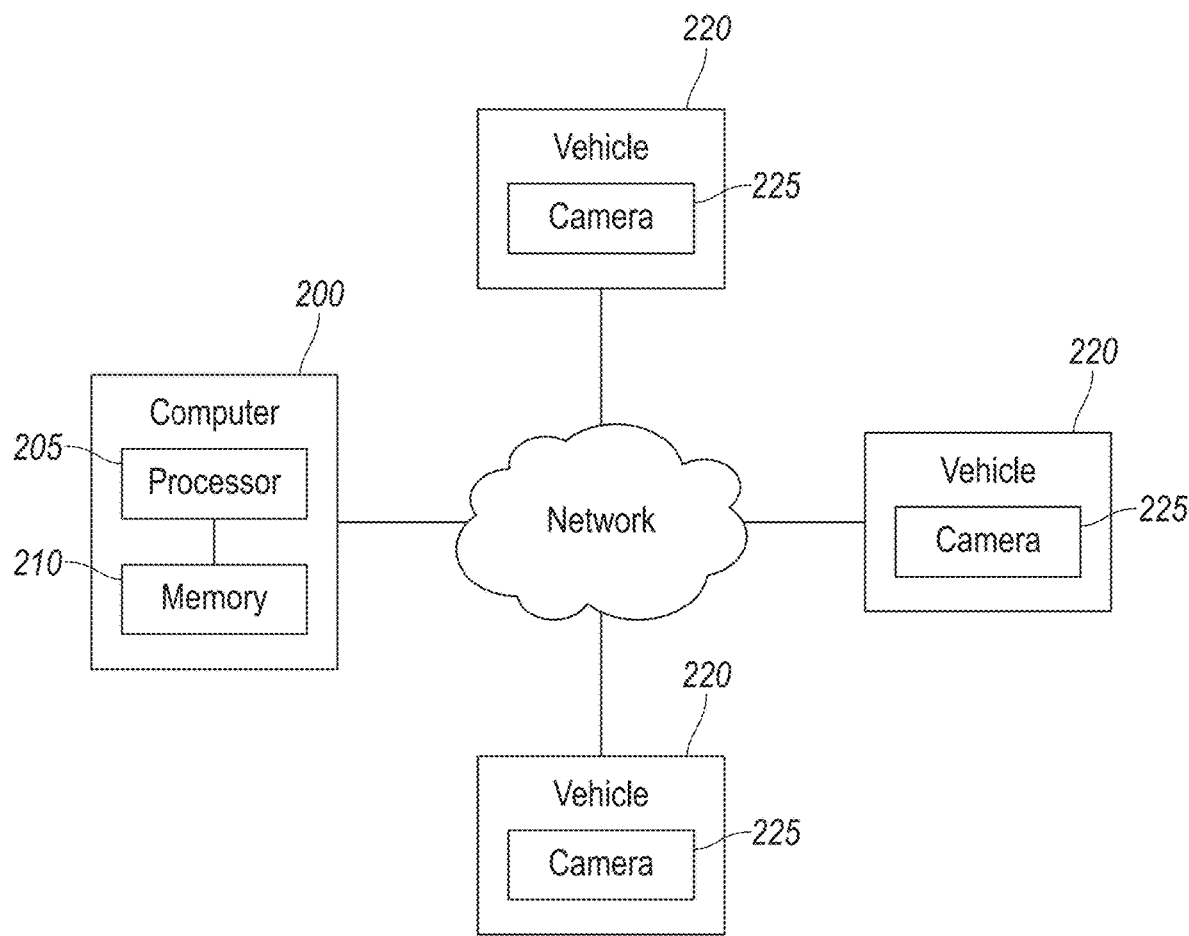
FIG. 2 is a block diagram of a system for collecting and analyzing image data.

With reference to FIG. 2, the computer 200 is a microprocessor-based computing device, e.g., a generic computing device including a processor 205 and a memory 210, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 200 can thus include a processor 205, a memory 210, etc. The memory 210 of the computer 200 can include media for storing instructions executable by the processor 205 as well as for electronically storing data and/or databases, and/or the computer 200 can include structures such as the foregoing by which programming is provided. The computer 200 can be multiple computers coupled together.

The computer 200 is connected to a network 215. The network 215 represents one or more mechanisms by which the computer 200 may communicate with remote servers. Accordingly, the network 215 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services. The computer 200 can communicate with, e.g., a plurality of vehicles 220 including cameras 225 and/or a plurality of standalone cameras 225.

The vehicles 220 may be any passenger or commercial automobiles such as cars, trucks, sport utility vehicles, crossovers, vans, minivans, taxis, buses, etc.

The cameras 225 can detect electromagnetic radiation in some range of wavelengths. For example, the cameras 225 may detect visible light, infrared radiation, ultraviolet light, or some range of wavelengths including visible, infrared, and/or ultraviolet light. For example, each camera 225 can be a charge-coupled device (CCD), complementary metal oxide semiconductor (CMOS), or any other suitable type. For another example, the sensors may be a time-of-flight (TOF) cameras, which include a modulated light source for illuminating the environment and detect both reflected light from the modulated light source and ambient light to sense reflectivity amplitudes and distances to the scene.

With reference to FIG. 3, the cameras 225 generate image data. The image data are a sequence of the images 300 of the fields of view of the respective cameras. FIG. 3 shows two images 300 from different cameras 225 at different times of different trailer hitches. Each image 300 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the image 300, i.e., position in the field of view of the sensor at the time that the image 300 was recorded, can be specified in pixel dimensions or coordinates, e.g., an ordered pair of pixel distances, such as a number of pixels from a top edge and a number of pixels from a left edge of the field of view.

Figure 4:
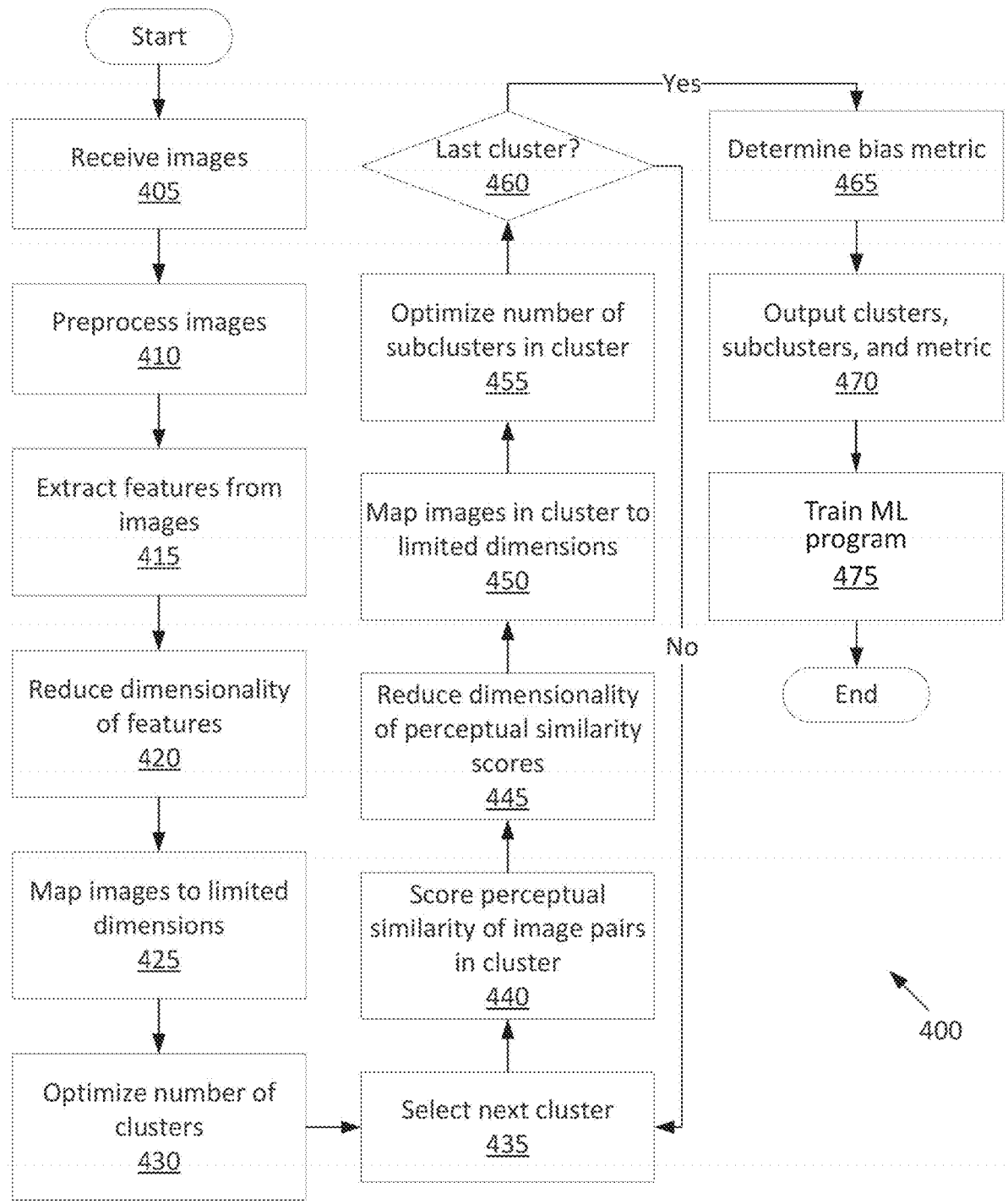
FIG. 4 is a process flow diagram of an example process for assessing bias in a dataset.

FIG. 4 is a process flow diagram illustrating an exemplary process 400 for assessing bias in a dataset 600. The memory 210 of the computer 200 stores executable instructions for performing the steps of the process 400 and/or programming can be implemented in structures such as mentioned above. As a general overview of the process 400, the computer 200 receives the images 300 in the dataset 600, preprocesses the images 300, extracts features from the images 300, reduces the dimensionality of the features, maps the images 300 to a space of a limited number of dimensions, and optimizes the number of clusters 900 into which the images 300 are grouped or clustered. Then, for each cluster 900, the computer 200 generates perceptual-similarity scores for each pair of images 300 in the cluster 900, reduces the dimensionality of the perceptual-similarity scores, maps the images 300 in the cluster 900 to a space of a limited number of dimensions, and optimizes the number of subclusters 1000 in the cluster 900 into which the images 300 in the cluster 900 are grouped or clustered. Finally, the computer 200 determines one or more metrics for the bias of the dataset 600 based on the number of clusters 900, the numbers of subclusters 1000, distances between the respective clusters 900, and distances between the respective subclusters 1000, and the computer 200 outputs the clusters 900, the subclusters 1000, and the metric(s).

The process 400 begins in a block 405, in which the computer 200 receives the images 300 of the dataset 600. The images 300 may have been curated into the dataset 600 after being received from different sources such as the vehicles 220 equipped with the cameras 225 or the stand-alone cameras 225. The images 300 may also have been curated into the dataset 600 from other sources such as preexisting repositories of images.

Next, in a block 410, the computer 200 preprocesses the images 300. For example, the computer 200 can crop or downsize the images 300 to a standard size, e.g., 224×224 pixels. The standard size can be required for feature extraction in block 415.

Figure 5:
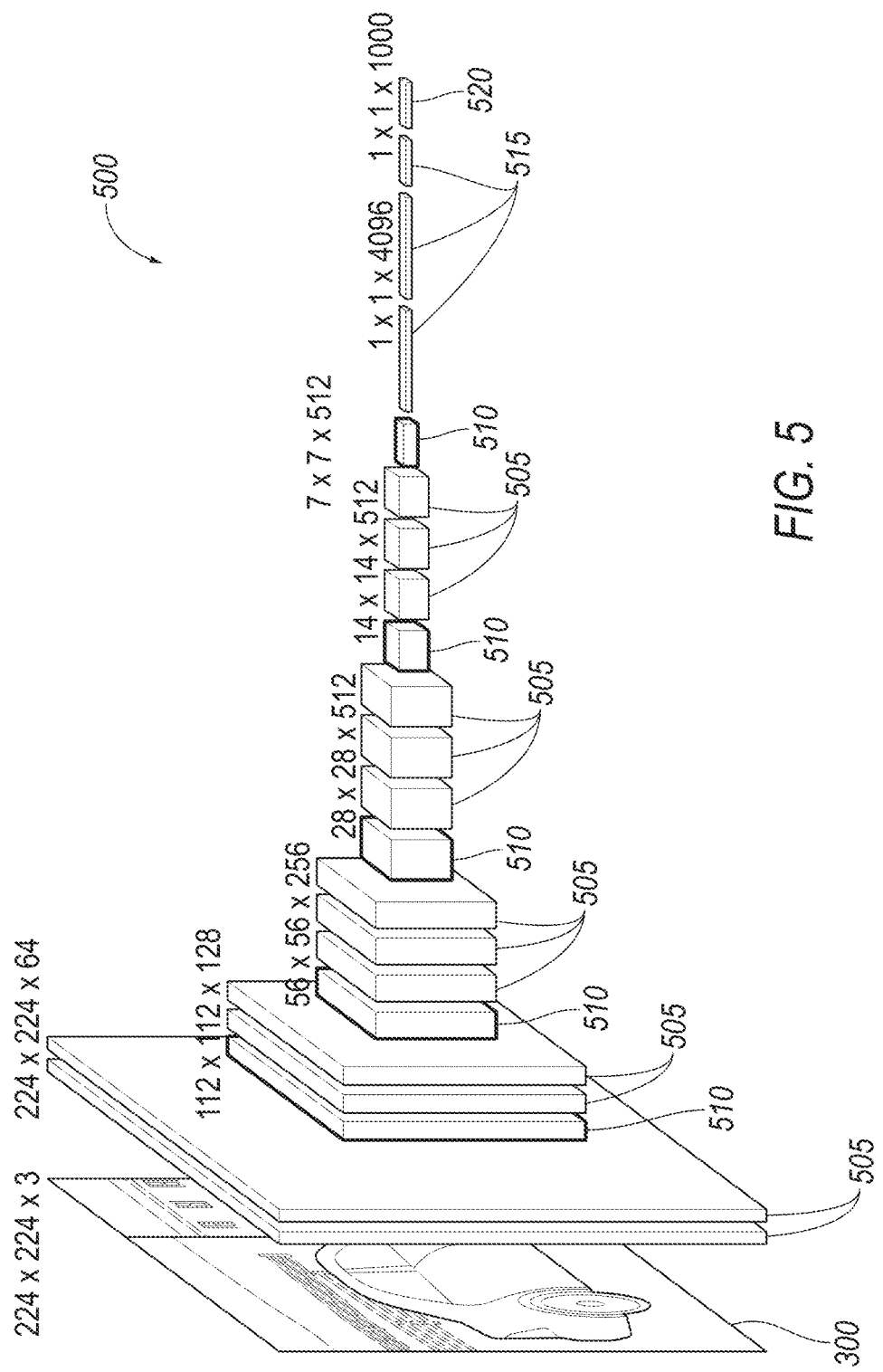
FIG. 5 is a diagram of an example machine-learning program for feature extraction.

Next, in the block 415, the computer 200 extracts features from the images 300. For the purposes of this disclosure, the term "feature" is used in its computer-vision sense as a piece of information about the content of an image, specifically about whether a certain region of the image has certain properties. Types of features may include edges, corners, blobs, etc. The features can be identified by a first machine-learning program 500 that is trained to identify objects in images, e.g., a convolutional neural network such as VGG16. VGG16 is shown in FIG. 5. The first machine-learning program 500 may include a series of layers 505-520, with each layer 505-520 using the previous layer 505-520 as input. Each layer 505-520 contains a plurality of neurons that receive as input data generated by a subset of the neurons of the previous layers 505-520 and generate output that is sent to neurons in the next layer 505-520. Types of layers 505-520 include convolutional layers 505, which compute a dot product of a weight and a small region of input data; pool layers 510, which perform a downsampling operation along spatial dimensions; fully connected layers 515, which generate based on the output of all neurons of the previous layer 505-520; and a softmax layer 520 as the final layer, which converts a vector of numbers into a probability distribution. The features can be the output of the first machine-learning program 500 at an intermediate layer 505-520. For example, the output from VGG16 can be taken from one of the fully connected layers 515 organized as a vector, e.g., with dimensions 1×1×4096 rather than the softmax layer 520, which is a smaller vector with dimensions 1×1×1000. The features of the images 300 can be encoded in a matrix, e.g., an N×4096 matrix, in which N is the number of images 300 and each row is the output for one of the images 300.

Next, in a block 420, the computer 200 reduces the dimensionality of the features extracted from the images 300. For example, the computer 200 can use principal component analysis (PCA) and can collect a subset of the principal components, e.g., the first principal components that can fit when assembled into a matrix of a predetermined size. The matrix of principal components can have a number of rows equal to the number of images 300 and a number of columns representing the principal components for each of the images 300. For example, if the number N of images 300 is less than a number of columns of the matrix of features from the block 415, e.g., 4096 the size of the matrix of principal components can be N×N/2, and if N is greater than or equal to the number of columns of the matrix of features, the size of the matrix of principal components can be N×2048. Each row of the matrix of principal components can include the principal components of one of the images 300.

Figure 6:
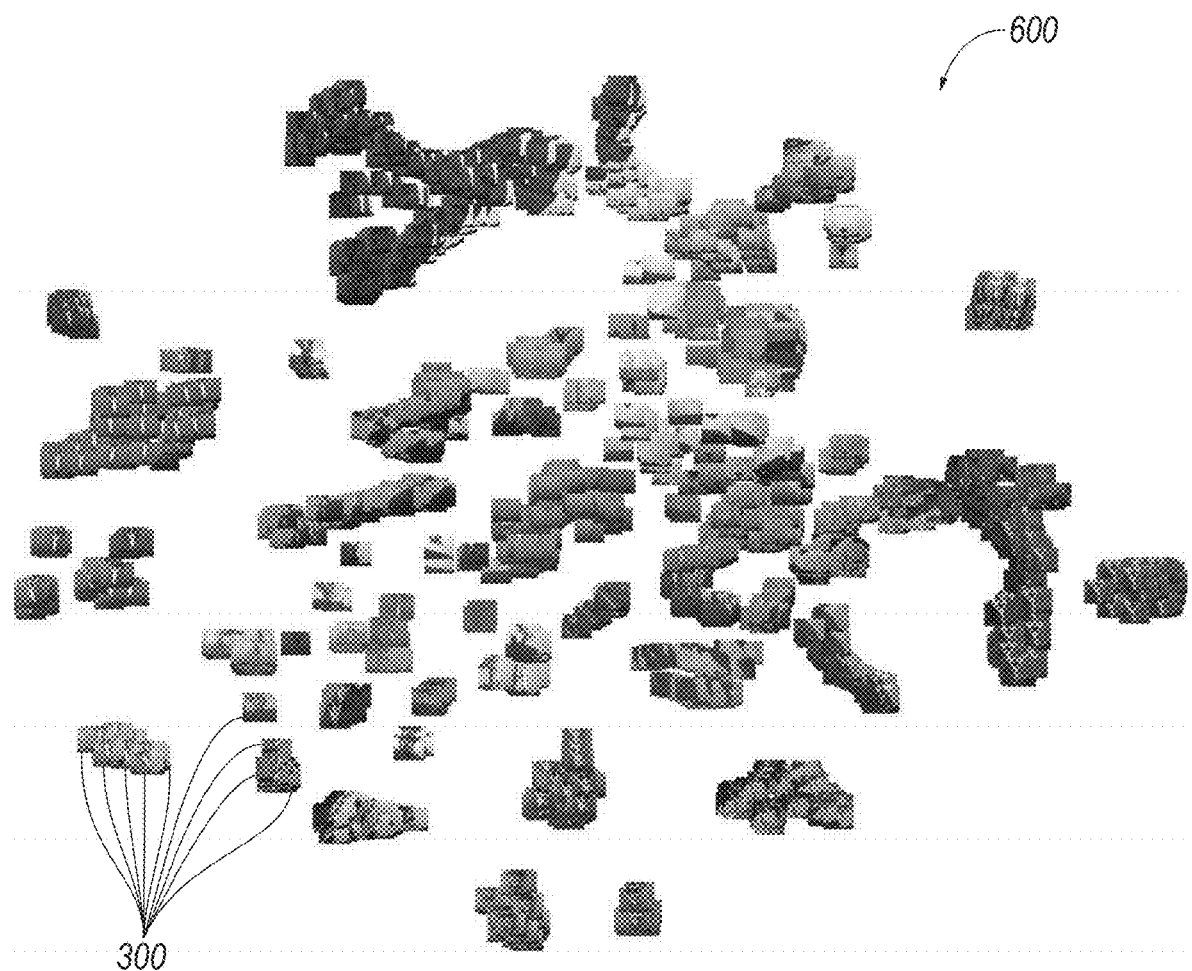
FIG. 6 is a plot of example images from a dataset mapped to a two-dimensional space.

Next, in a block 425, the computer 200 reduces the dimensionality of the matrix of principal components from the block 420 by mapping to a limited number of dimensions. The limited number of dimensions can be a preset value stored in the computer 200. The limited number of dimensions can be chosen so as to permit a human operator to visualize the results, e.g., 2. For example, the computer 200 can use any suitable technique for reducing to a limited number of dimensions, e.g., pairwise controlled manifold approximation projection (PaCMAP), t-distributed stochastic neighbor embedding (t-SNE), uniform manifold approximation and projection (UMAP), etc., as are known. FIG. 6 shows a diagram of the images 300 arranged in a two-dimensional space according to the mapping. The computer 200 can output a matrix in which each row has the coordinates of one of the images 300 in a space of the limited number of dimensions, e.g., an N×2 matrix for a two-dimensional space.

Figure 7:
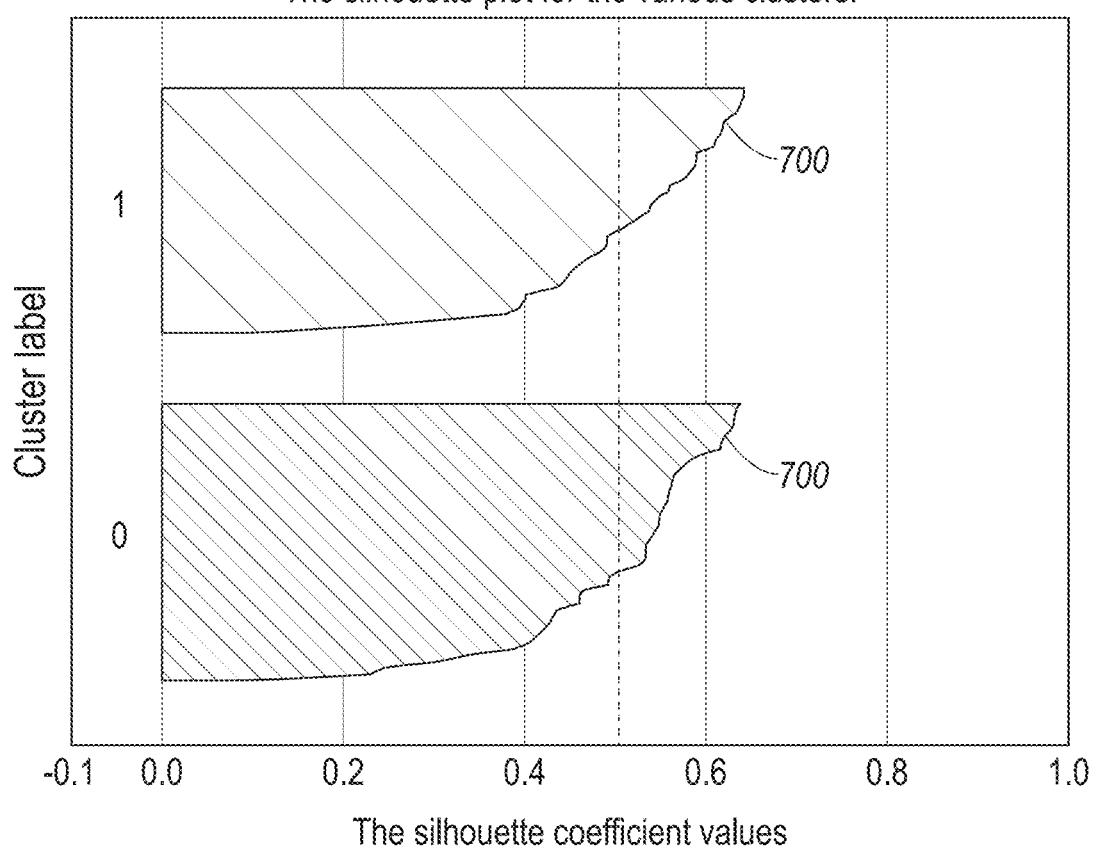
FIG. 7 is an example silhouette plot of two clusters from a dataset.
Figure 8:
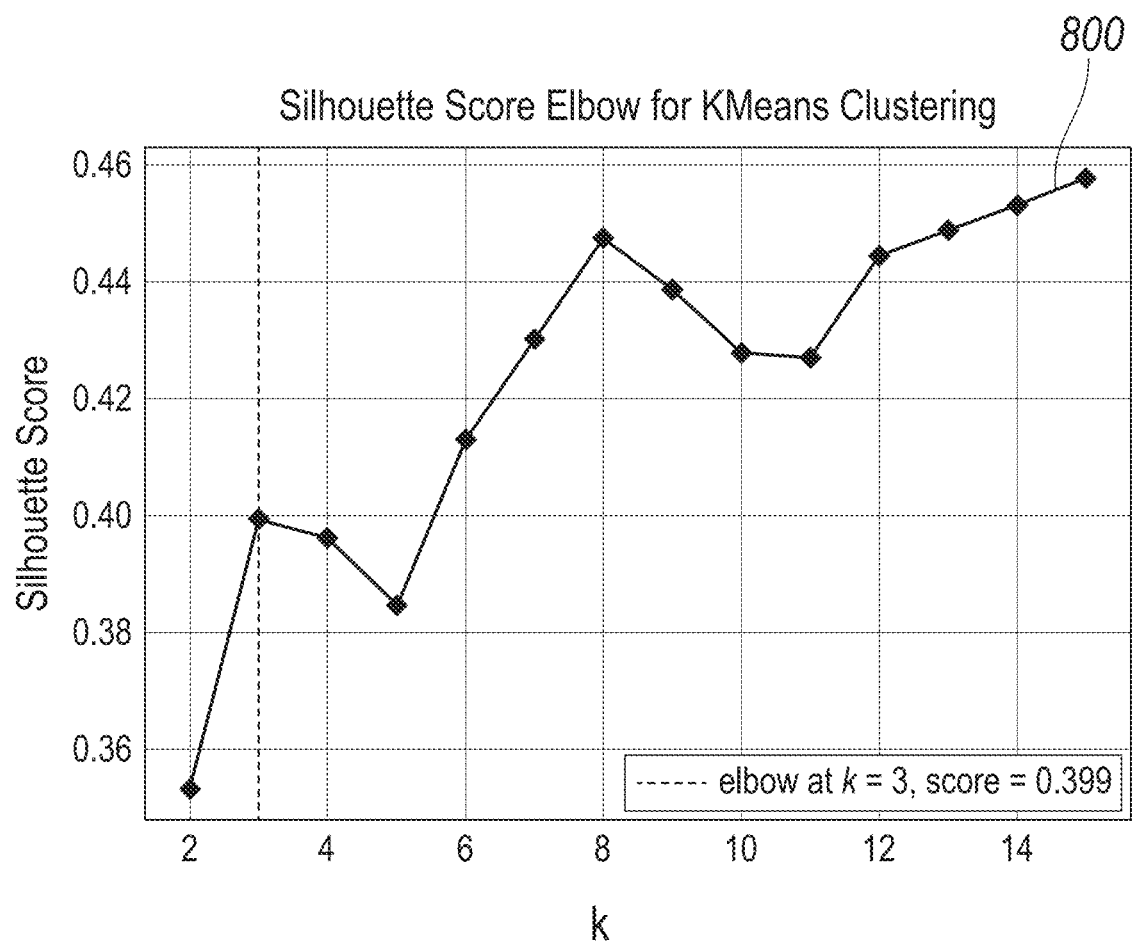
FIG. 8 is an example plot of silhouette scores for numbers of clusters into which a dataset is categorized.
Figure 9:
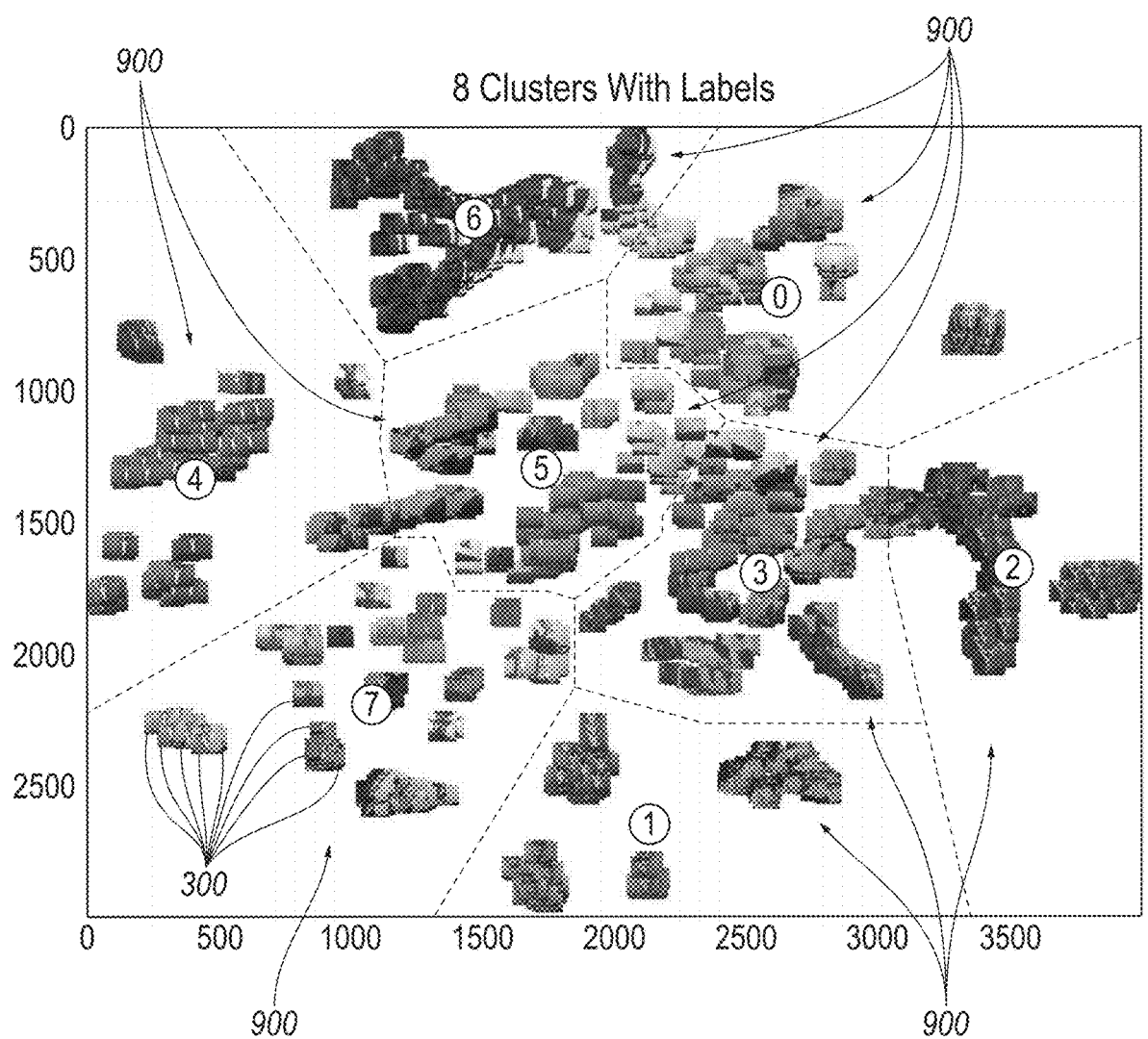
FIG. 9 is a plot of the images with example labels for clusters.

Next, in a block 430, the computer 200 can sort the images 300 into clusters 900 while determining an optimal number of the clusters 900. The computer 200 can use any suitable clustering algorithm, with either a fixed number of clusters or a variable number of clusters. Clustering the images 300 is based on the features, i.e., the feature data; for example, the computer 200 can use the matrix outputted in the block 425 as an input to the clustering algorithm. As a first example, the computer 200 can perform a clustering algorithm requiring a fixed number of clusters k such as k-means clustering. The computer 200 can perform the cluster algorithm for multiple values of the number of clusters k, e.g., for k=2 through k=15. For each value for k, the computer 200 can output a silhouette score. A silhouette plot 700 for determining the silhouette score is shown in FIG. 7. The silhouette score is a mean of individual silhouette scores for the respective images 300. Each individual silhouette score is a quotient of a difference between a dissimilarity score of one image 300 and a similarity score of that image 300 divided by the maximum of the dissimilarity score and the similarity score, i.e., $s(i) = (b(i)-a(i))/\max\{a(i), b(i)\}$, in which s is the individual silhouette score, i is an index of the images 300, b is the dissimilarity score, and a is the similarity score. The similarity score is the mean distance between the image 300 and the other images 300 in the same cluster 900. The dissimilarity score is the smallest mean distance between the image 300 and the images 300 of one other cluster 900. Any suitable definition may be used, e.g., Euclidean distance, Manhattan distance, etc. A plot 800 of silhouette scores versus values of k is shown in FIG. 8. The computer 200 can select the number of clusters k based on the silhouette scores, e.g., based on an elbow of the plot 800 of silhouette scores (e.g., k=3 as shown in FIG. 8), a local maximum of the silhouette score (e.g., k=8 as shown in FIG. 8), or a global maximum of the silhouette score (e.g., k=15 as shown in FIG. 8). Alternatively to using the silhouette score, the computer 200 can output plots of the images 300 sorted into labeled clusters 900 for each value of k to a human operator, and the computer 200 can then receive a selection of the value of k from the human operator. FIG. 9 shows a plot of images 300 arranged in the two-dimensional space sorted into eight clusters 900, i.e., k=8. As a second example, the computer 200 can perform a clustering algorithm with a variable number of clusters such as density-based spatial clustering of applications with noise (DBSCAN), as is known. The computer 200 can determine a number k of the clusters 900 and can sort the images 300 into the clusters 900 as part of performing the clustering algorithm with a variable number of clusters.

Next, in blocks 435-460, the computer 200 iterates through the clusters 900 determined in the block 430. In the block 435, the computer 200 selects the next cluster 900 in a preset order from the clusters 900 as the cluster 900 of interest for the blocks 440-460. The preset order can be based on, e.g., arbitrarily assigned numerical labels for the clusters 900, e.g., 0 through 7 as shown in FIG. 9.

Next, in a block 440, the computer 200 determines a perceptual-similarity score between each pair of images 300 in the cluster 900 of interest. A perceptual-similarity score is a metric approximating human perceptual similarity between two images 300, i.e., approximating how similar a person is likely to judge two images 300 to be. The input for determining the perceptual-similarity score between two images 300 can be the two images 300 as preprocessed in the block 410. One example of a perceptual-similarity score is learned perceptual image patch similarity (LPIPS), which is beneficial because it provides perceptual-similarity scores more in line with human judgment than other techniques for determining a perceptual-similarity score. The output of the block 440 is an n×n matrix, in which n is the number of images 300 in the cluster 900 of interest. The rows and columns of the matrix represent the images 300 in the cluster 900 of interest, and each entry in the matrix is the perceptual-similarity score between the image 300 represented by that row and the image 300 represented by that column.

Next, in a block 445, the computer 200 reduces the dimensionality of the perceptual-similarity scores from the images 300 in the cluster 900 of interest. For example, the computer 200 can use PCA and can collect a subset of the principal components, e.g., the first principal components that can fit when assembled in a matrix of a predetermined size. The matrix of principal components can have a number of rows equal to the number of images 300 in the cluster 900 of interest and a number of columns representing the principal components for each of the images 300. For example, the matrix of principal components can be an n×n/2 matrix, in which n is the number of images 300 in the cluster 900 of interest. Each row of the matrix of principal components can represent the principal components of one of the images 300.

Figure 10:
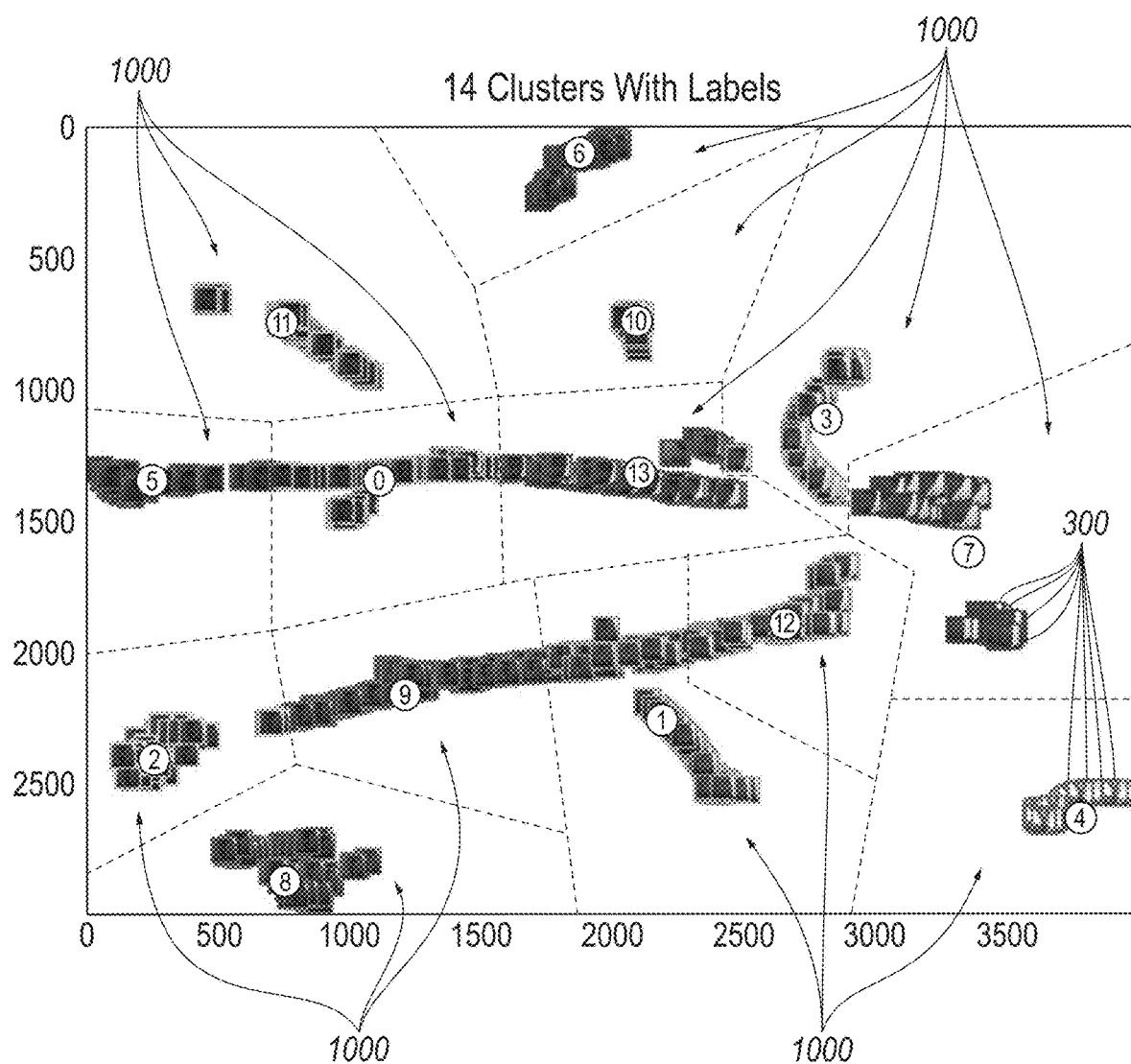
FIG. 10 is a plot of images from one of the clusters with example labels for subclusters.

Next, in a block 450, the computer 200 reduces the dimensionality of the matrix of principal components from the block 445 by mapping to a limited number of dimensions. The limited number of dimensions can be a preset value stored in the computer 200. The limited number of dimensions can be chosen to as to permit a human operator to visualize the results, e.g., 2. For example, the computer 200 can use any suitable technique for reducing to a limited number of dimensions, e.g., PaCMAP, t-SNE, UMAP, etc., as are known. FIG. 10 shows a diagram of the images 300 in the cluster 900 of interest arranged in a two-dimensional space according to the mapping. In the example of FIG. 10, the images 300 are from the cluster 900 labeled 6 in FIG. 9. The computer 200 can output a matrix in which each row has the coordinates of one of the images 300 from the cluster 900 of interest in a space of the limited number of dimensions, e.g., an n×2 matrix for a two-dimensional space.

Next, in a block 455, the computer 200 can sort the images 300 from the cluster 900 of interest into subclusters 1000 while determining an optimal number of the subclusters 1000. The computer 200 can use any suitable clustering algorithm, with either a fixed number of clusters or a variable number of clusters. The computer 200 can use the matrix outputted in the block 450 as an input to the clustering algorithm. As a first example, the computer 200 can perform a clustering algorithm requiring a fixed number of clusters k such as k-means clustering. The computer 200 can perform the cluster algorithm for multiple values of the number of subclusters 1000k, e.g., for k=2 through k=15. For each value for k, the computer 200 can output a silhouette score for that value of k subclusters 1000 in the same manner as described above with respect to the block 430 for the number of clusters 900. The computer 200 can select the number k of subclusters 1000 in the cluster 900 of interest based on the silhouette scores, e.g., based on an elbow of the plot of silhouette scores, a local maximum of the silhouette score, or a global maximum of the silhouette score. Alternatively to using the silhouette score, the computer 200 can output plots of the images 300 in the cluster 900 of interest sorted into labeled subclusters 1000 for each value of k to a human operator, and the computer 200 can then receive a selection of the value of k from the human operator. FIG. 10 shows a plot of the images 300 from the cluster 900 labeled 6 in FIG. 9 arranged in the two-dimensional space sorted into fourteen subclusters 1000, i.e., k=14. As a second example, the computer 200 can perform a clustering algorithm with a variable number of clusters such as DBSCAN, as is known. The computer 200 can determine a number k of the subclusters 1000 and can sort the images 300 in the cluster 900 of interest into the subclusters 1000 as part of performing the clustering algorithm with a variable number of clusters.

Next, in a decision block 460, the computer 200 determines whether the cluster 900 of interest is the last cluster 900 in the preset order. If not, the process 400 returns to the block 435 to iterate to the next cluster 900 in the preset order. If so, the process 400 proceeds to a block 465.

In the block 465, the computer 200 determines one or more metrics indicating the bias of the dataset 600 of the images 300 toward one or more of the clusters 900 or subclusters 1000. For example, the computer 200 can determine distances between each pair of clusters 900 and distances between each pair of subclusters 1000 within a cluster 900. The distance can be, e.g., a Euclidean distance between the centroids of the respective clusters 900 or subclusters 1000 in the two-dimensional space to which the images 300 were mapped in the block 425 or 450. For another example, the computer 200 can output the number of clusters 900 and the numbers of subclusters 1000 in the respective clusters 900. For another example, the computer 200 can calculate a metric comparing the distances and/or the numbers of clusters 900 and subclusters 1000 with distances and/or numbers of clusters 900 and subclusters 1000 from an earlier execution of the process 400 on the same dataset 600 of the images 300. For another example, the computer 200 can calculate a metric based on the number of clusters 900, the number of subclusters 1000, the distances between the respective clusters 900, and the distances between the respective subclusters 1000 within the respective clusters 900.

Next, in a block 470, the computer 200 outputs the metric or metrics determined in the block 465. The computer 200 also outputs the clusters 900 and subclusters 1000, i.e., which images 300 from the dataset 600 are members of each cluster 900 and subcluster 1000. A human operator can use the clusters 900 and subclusters 1000 to apply metadata to the images 300. The advantage of using the subclusters 1000 in addition to the clusters 900 is capturing nuances such as, in the example of images 300 of trailers, the wires and chains used in the hookup and the shadows cast by surrounding objects such as the vehicle 220, as seen in FIG. 3, which can then be encoded as metadata for the images 300. Such nuances are currently not typically captured as metadata. A training set can be constructed from the images 300 using the subclusters 1000 such that the same or approximately the same number of images 300 are used from each subcluster 1000, thus providing less biased training for a second machine-learning program.

Next, in a block 475, the computer 200 trains the second machine-learning program using the training set constructed from the images 300. Because the second machine-learning program is trained after outputting the metric, a human operator or the computer 200 may use the metric to determine whether the dataset 600 is sufficiently unbiased to use for constructing the training set. For example, the computer 200 may train the second machine-learning program upon determining that the metric is within a threshold, and the computer 200 may refrain from training the second machine-learning program upon determining that the metric exceeds the threshold. Alternatively or additionally, the human operator may eliminate images 300 from overrepresented clusters 900 or subclusters 1000 from the dataset 600 and then execute the process 400 on the resulting new dataset. The second machine-learning program may be an object-recognition program, e.g., using a convolutional neural network. The training set may include at least a subset of the images 300, e.g., leaving a second subset including the remaining images 300 to serve as a validation set. The metadata based on the clusters 900 and subclusters 1000 may be used as ground truth for the training. For example, the second machine-learning program may be trained to recognized different types of trailer hitches. Once trained, the second machine-learning program may be installed on a vehicle computer of a vehicle 220, and the vehicle computer may be programmed to actuate the vehicle 220 based on classifications outputted by the second machine-learning program, e.g., by actuating one or more of a propulsion system, a brake system, and/or a steering system of a vehicle 220. For example, the vehicle computer may use the classification of an object as a particular type of trailer hitch to select a point to which to navigate a tow ball of the vehicle 220, e.g., by autonomously steering the vehicle 220 as the vehicle 220 travels in reverse in order to hitch the trailer. Because of the reduced bias in the training set used for training the second machine-learning program, the second machine-learning program may classify types of, e.g., trailer hitches more reliably, resulting in good-quality operation of the autonomous trailer hitching. After the block 475, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   receive a dataset of images;
   extract feature data from the images;
   optimize a number of clusters into which the images are classified based on the feature data, wherein optimizing the number of clusters includes performing k-means clustering for a plurality of values for the number of clusters, determining the silhouette score for each of the values, and selecting one of the values based on the silhouette scores;
   for each cluster, determine a perceptual-similarity score between each pair of the images in that cluster;
   for each cluster, reduce a dimensionality of the perceptual-similarity scores for that cluster, wherein, for each cluster, reducing the dimensionality of the perceptual-similarity scores includes performing principal component analysis;
   for each cluster, optimize a number of subclusters into which the images in that cluster are classified, wherein, for each cluster, optimizing the number of subclusters in that cluster is based on the perceptual-similarity scores for that cluster after reducing the dimensionality;
   in response to optimizing the number of the clusters and the numbers of the subclusters, determine a metric indicating a bias of the dataset toward at least one of the clusters or subclusters based on the number of clusters, the numbers of subclusters, distances between the respective clusters, and distances between the respective subclusters, wherein the bias toward the at least one of the clusters or subclusters indicates overrepresentation of the at least one of the clusters or subclusters in the dataset of the images; and
   after determining the metric, train a machine-learning program using a training set constructed from the clusters and the subclusters.

2. The computer of claim 1, wherein the instructions further include instructions to reduce a dimensionality of the feature data.

3. The computer of claim 2, wherein optimizing the number of clusters is based on the feature data after reducing the dimensionality.

4. The computer of claim 2, wherein the instructions further include instructions to, after reducing the dimensionality of the feature data, map the feature data to a limited number of dimensions.

5. The computer of claim 4, wherein the limited number of dimensions is two.

6. The computer of claim 2, wherein reducing the dimensionality of the feature data includes performing principal component analysis.

7. The computer of claim 6, wherein the principal component analysis results in a matrix of principal components, and the instructions further include instructions to map the matrix of principal components to a limited number of dimensions.

8. The computer of claim 1, wherein the machine-learning program is a second machine-learning program, and extracting the feature data includes executing a first machine-learning program.

9. The computer of claim 8, wherein the first machine-learning program is trained to identify objects in images, and the feature data is output from an intermediate layer of the first machine-learning program.

10. The computer of claim 1, wherein the distances between the respective clusters are distances between centroids of the respective clusters, and the distances between the respective subclusters are distances between centroids of the respective subclusters.

11. The computer of claim 1, wherein, for each cluster, the principal component analysis results in a matrix of principal components, and the instructions further include instructions to map the matrix of principal components to a limited number of dimensions.

12. The computer of claim 11, wherein the limited number of dimensions is two.

13. The computer of claim 1, wherein the clusters and subclusters serve as ground truth when training the machine-learning program.

14. The computer of claim 1, wherein the instructions further include instructions to construct the training set from the clusters and subclusters by performing at least one of automatic metadata annotation correction, complex edge/corner cases detection, training and test dataset curation for artificial-intelligence and machine-learning models, data augmentation guidance, or visualization and quantification of gaps between simulated and real datasets, based on the metric.

15. A method comprising:
   receiving a dataset of images;
   extracting feature data from the images;
   optimizing a number of clusters into which the images are classified based on the feature data, wherein optimizing the number of clusters includes performing k-means clustering for a plurality of values for the number of clusters, determining the silhouette score for each of the values, and selecting one of the values based on the silhouette scores;
   for each cluster, determining a perceptual-similarity score between each pair of the images in that cluster;
   for each cluster, reduce a dimensionality of the perceptual-similarity scores for that cluster, wherein, for each cluster, reducing the dimensionality of the perceptual-similarity scores includes performing principal component analysis;
   for each cluster, optimizing a number of subclusters into which the images in that cluster are classified, wherein, for each cluster, optimizing the number of subclusters in that cluster is based on the perceptual-similarity scores for that cluster after reducing the dimensionality;
   in response to optimizing the number of the clusters and the numbers of the subclusters, determining a metric indicating a bias of the dataset toward at least one of the clusters or subclusters based on the number of clusters, the numbers of subclusters, distances between the respective clusters, and distances between the respective subclusters, wherein the bias toward the at least one of the clusters or subclusters indicates overrepresentation of the at least one of the clusters or subclusters in the dataset of the images; and
   after determining the metric, training a machine-learning program using a training set constructed from the clusters and the subclusters.

* * * * *